United States Patent
Alpman et al.

(10) Patent No.: US 10,906,541 B2
(45) Date of Patent: Feb. 2, 2021

(54) METHOD FOR BRAKING A VEHICLE ON A SLOPE

(71) Applicant: Ford Global Technologies, LLC, Dearborn, MI (US)

(72) Inventors: Erik Alpman, Aachen (DE); Kai Skolik, Würselen (DE); George Neugebauer, Herzogenrath (DE); Stephan Strahl, Bayern (DE)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 15/809,181

(22) Filed: Nov. 10, 2017

(65) Prior Publication Data

US 2018/0134292 A1 May 17, 2018

(30) Foreign Application Priority Data

Nov. 11, 2016 (DE) .......................... 10 2016 222 172

(51) Int. Cl.
*B60W 30/14* (2006.01)
*B60W 10/18* (2012.01)
(Continued)

(52) U.S. Cl.
CPC .......... *B60W 30/143* (2013.01); *B60T 7/042* (2013.01); *B60T 7/122* (2013.01); *B60T 8/00* (2013.01);
(Continued)

(58) Field of Classification Search
CPC .......... B60W 30/143; B60W 2720/10; B60W 2552/15; B60W 10/18; B60W 2520/10; B60W 10/04; B60W 30/18118; B60W 2710/18; B60W 30/146; B60W 2552/20; B60W 2520/105; B60W 30/18172;
(Continued)

(56) References Cited

U.S. PATENT DOCUMENTS 4,712,839 A 12/1987 Brearley et al.
6,249,735 B1 6/2001 Yamada et al.
(Continued)

FOREIGN PATENT DOCUMENTS

EP 2902278 A1 5/2015
JP 4826421 B2 11/2011

*Primary Examiner* — Tuan C To
*Assistant Examiner* — Paul A Castro
(74) *Attorney, Agent, or Firm* — Raymond L. Coppiellie; Burgess Law Office, PLLC

(57) ABSTRACT

A method for braking a vehicle to a stop on a sloping section of a roadway wherein a slope inclination of the roadway section, a vehicle speed, an acceleration, and a vehicle brake operation status of the vehicle are continuously ascertained. The slope inclination of the roadway section and the vehicle brake operation status are compared with predetermined threshold values. The method includes activating a braking torque, continuously determined based on the slope inclination, the driving speed, and the acceleration when the instantaneous slope inclination of the roadway section reaches or exceeds the predetermined threshold value for a sloping section and the vehicle brake operation status lies within a predetermined range or value. The braking torque being independent of the vehicle brake operation status.

12 Claims, 4 Drawing Sheets

(51) Int. Cl.
  *B60W 10/22* (2006.01)
  *B60W 40/13* (2012.01)
  *B60T 8/00* (2006.01)
  *B60T 8/17* (2006.01)
  *B60T 7/04* (2006.01)
  *B60T 7/12* (2006.01)

(52) U.S. Cl.
  CPC ............... *B60T 8/17* (2013.01); *B60W 10/18* (2013.01); *B60W 10/22* (2013.01); *B60W 40/13* (2013.01); *B60T 2201/04* (2013.01); *B60T 2201/06* (2013.01); *B60W 2510/18* (2013.01); *B60W 2520/105* (2013.01); *B60W 2530/10* (2013.01); *B60W 2552/15* (2020.02); *B60W 2710/18* (2013.01); *B60W 2710/223* (2013.01); *B60W 2720/10* (2013.01)

(58) Field of Classification Search
  CPC ........... B60W 2720/106; B60W 30/00; B60W 2510/18; B60W 10/00; B60W 10/22; B60W 30/18063; B60W 30/18109; B60W 40/076; B60W 20/15; B60W 2510/22; B60W 2530/10; B60T 2201/06; B60T 2201/04; B60T 8/245; B60T 8/171; B60T 8/172; B60T 8/17; B60T 2201/03; B60T 2260/09; B60T 2260/06; B60T 8/32; B60T 10/00; B60L 15/2081; B60L 2240/642; B60L 2240/14; B60L 2240/461; B60L 2240/465; Y10S 188/02; Y10S 477/901; Y10T 477/84; Y10T 477/847; Y10T 477/81

See application file for complete search history.

(56) References Cited

U.S. PATENT DOCUMENTS

| | | |
|---|---|---|
| 6,980,900 B2 | 12/2005 | Grieser |
| 8,401,757 B2 | 3/2013 | Tokimasa et al. |
| 8,954,253 B2 | 2/2015 | Terasaka et al. |
| 9,580,052 B2 | 2/2017 | Batz et al. |
| 2009/0198427 A1* | 8/2009 | Christopher Jackson .................. B60T 7/122 701/70 |
| 2018/0043793 A1* | 2/2018 | Herb ..................... B60W 30/16 |

* cited by examiner

METHOD FOR BRAKING A VEHICLE ON A SLOPE

CROSS-REFERENCE TO RELATED APPLICATIONS

Not Applicable.

BACKGROUND OF THE INVENTION

1. Field of the Invention

A method for braking a vehicle, including a braking assistance system.

2. Description of Related Art

Hill start assistance systems (HSA system) operate to prevent rolling-back when a vehicle is starting on a slope. The hill start assistance system uses a vehicle brake to hold the vehicle for a specific time period while the driver moves his foot from the brake pedal to the accelerator pedal. The brake is released when, by pressing on the accelerator pedal, the driver requests enough engine power to move the vehicle or maintain the vehicle position. The hill start assistance system typically uses the signal of an inclination sensor, which detects a slope above a predetermined threshold value.

Braking assistance systems use sensors that register the pressure and speed of brake pedal operation. The sensor can be, for example, a pressure sensor that detects the pressure in a brake cylinder. A braking assistance system may activate when predetermined minimum values for pressure and speed of operation of the brake pedal, specifically minimum values required for an effective braking process, are undershot.

Other sensors, such as a rotation speed sensor, or an acceleration sensor connected to the vehicle body for example, may also be used to estimate the pressure or force exerted onto the brake pedal.

Inexperienced drivers may find it difficult to engage in a braking process with subsequent stoppage on a sloping section. During the braking process, the vehicle body may rock and move backward if the brake pedal is not precisely operated. An end phase of the braking process on the slope requires particular sensitivity on the part of the driver, excessively late braking can lead to the vehicle rolling backward before the subsequent stoppage is achieved. Excessively strong braking may lead to premature, abrupt stoppage, which is associated with a very strong braking sensation and is detrimental to comfort. Furthermore, shock absorbers of the vehicle set to be soft can amplify the rocking and backward movements of the vehicle body if the braking process is not sufficiently executed.

SUMMARY OF THE INVENTION

A method for braking a vehicle on a slope including ascertaining a slope inclination, a vehicle speed, a vehicle acceleration, and a vehicle brake operation status. Using these parameters when the slope inclination reaches a predetermined threshold value and the vehicle brake operation status lies within a predetermined interval activating a braking torque based on the slope inclination, the driving speed, the acceleration. The braking torque being independent of the vehicle brake operation status.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different figures, identical parts are always provided with the same reference symbols, and therefore said parts are generally also described only once.

Figure 1:
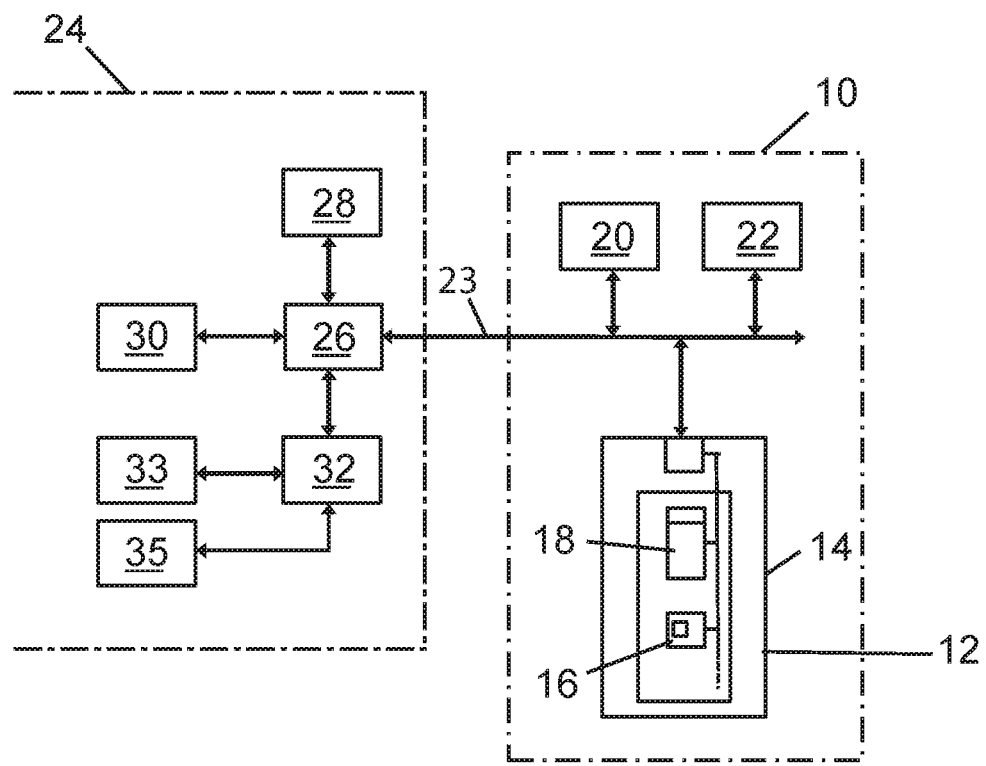
FIG. 1 is a schematic illustration of a braking assistance system according to an exemplary embodiment of the invention.

FIG. 1 is a schematic illustration of an embodiment of a braking assistance system 10 for braking a vehicle 24 with subsequently stopping on a sloping section. The braking assistance system 10 includes an electronic control unit 12, an inclination sensor 20, connected to the control unit 12, and an acceleration sensor 22 connected to the control unit 12. The electronic control unit 12 includes a microcontroller 14 having a processing unit 16 and a digital data memory unit 18 connected to the processing unit 16.

The inclination sensor may be a commercial, capacitive inclination sensor with an accuracy of, for example, 0.1%. The acceleration sensor may be, for example, a microelectromechanical system (MEMS).

The electronic control unit 12 includes an interface, such as a CAN bus 23, for receiving data. The electronic control unit 12 receives data from the inclination sensor 20 and the acceleration sensor 22 via the CAN bus interface.

The braking assistance system 10 in the exemplary embodiment is installed in a vehicle 24, for example, a passenger car. The vehicle 24 having an electronic vehicle controller 26 or vehicle control unit (VCU) connected to a brake pedal position sensor or other apparatus 28 capable of determining a brake pedal position and correspondingly an instantaneous operation status of the vehicle brakes 35 of the vehicle 24. The vehicle also having a vehicle velocity or speed measurement system 30 for determining an instantaneous velocity or speed v of the vehicle 24; a controller 32 for controlling the brakes 35 of the vehicle 24; and settable, for example rear, shock absorbers 33. The electronic vehicle controller 26, the brake pedal position sensor 28 for determining a brake pedal position, the speed measurement system 30, the controller 32 for controlling the brakes 35, and the shock absorbers 33 are constituent parts of the vehicle 24.

The electronic control unit 12 connected to the electronic vehicle controller 26 by the CAN bus interface receiving data from the speed measurement system 30 and from the brake pedal position sensor 28 for determining an instantaneous brake pedal position. The electronic control unit 12 also capable of sending data to the electronic vehicle controller 26 via the CAN bus interface.

The electronic control unit 12 intended to continuously determine or ascertain the instantaneous vehicle velocity or speed v, the instantaneous operation status of the brake, the instantaneous slope inclination of the roadway section, and the instantaneous vehicle acceleration a. The electronic control unit 12 operable to activate an instantaneous braking torque BM based on the determined instantaneous slope inclination, the instantaneous vehicle velocity or speed v, and the instantaneous vehicle acceleration a when the instantaneous operation status of the brake reaches or exceeds at least a predetermined threshold value and the instantaneous slope inclination of the roadway section reaches or exceeds a predetermined threshold value for a sloping section.

The predetermined threshold values, maximum values and intervals mentioned in this description of the exemplary embodiment are stored in the digital data memory unit 18.

Figure 2A:
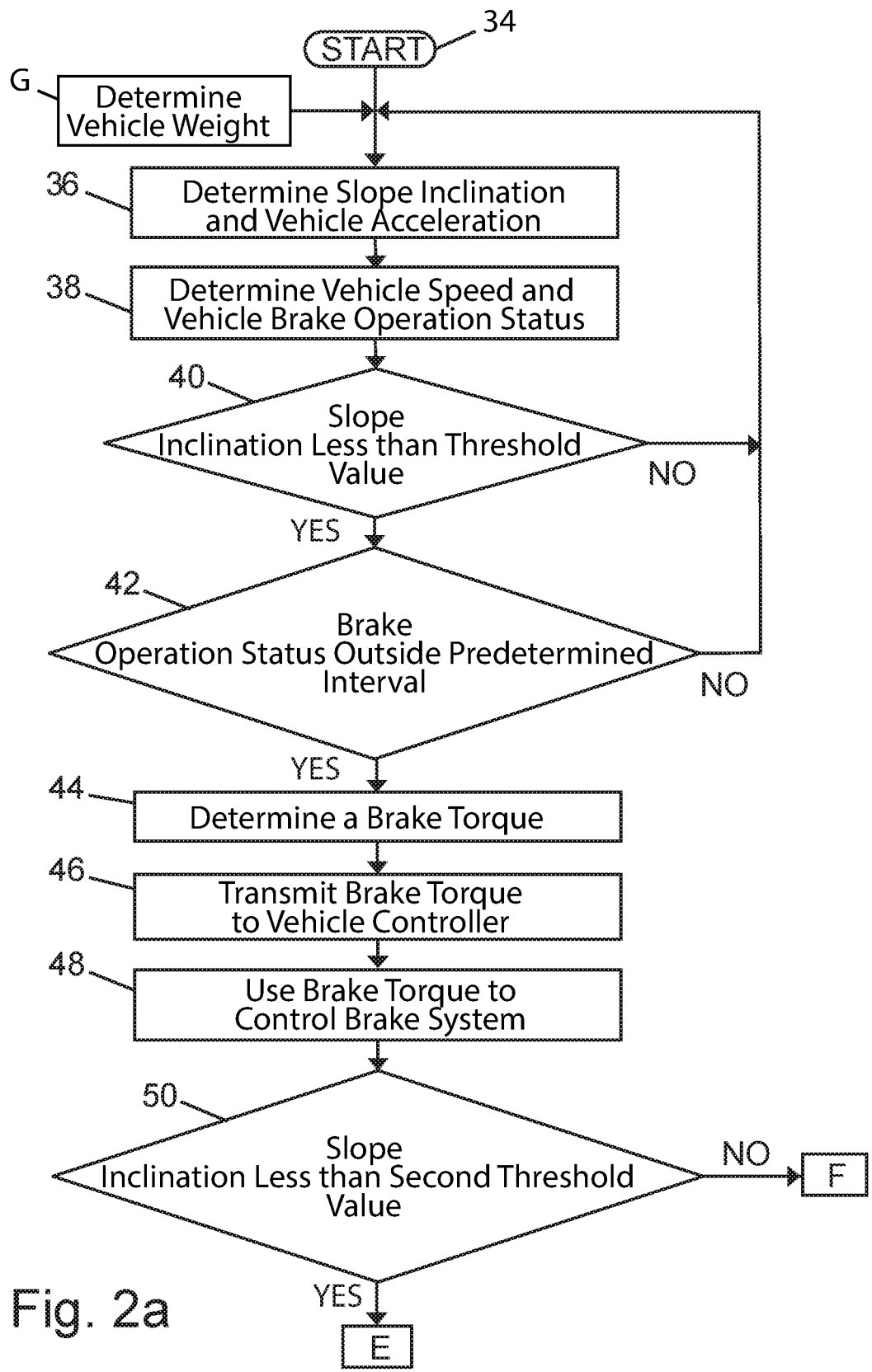
FIGS. 2a and 2b are a flowchart of a method for braking a vehicle that subsequently stops on a sloping section.
Figure 2B:
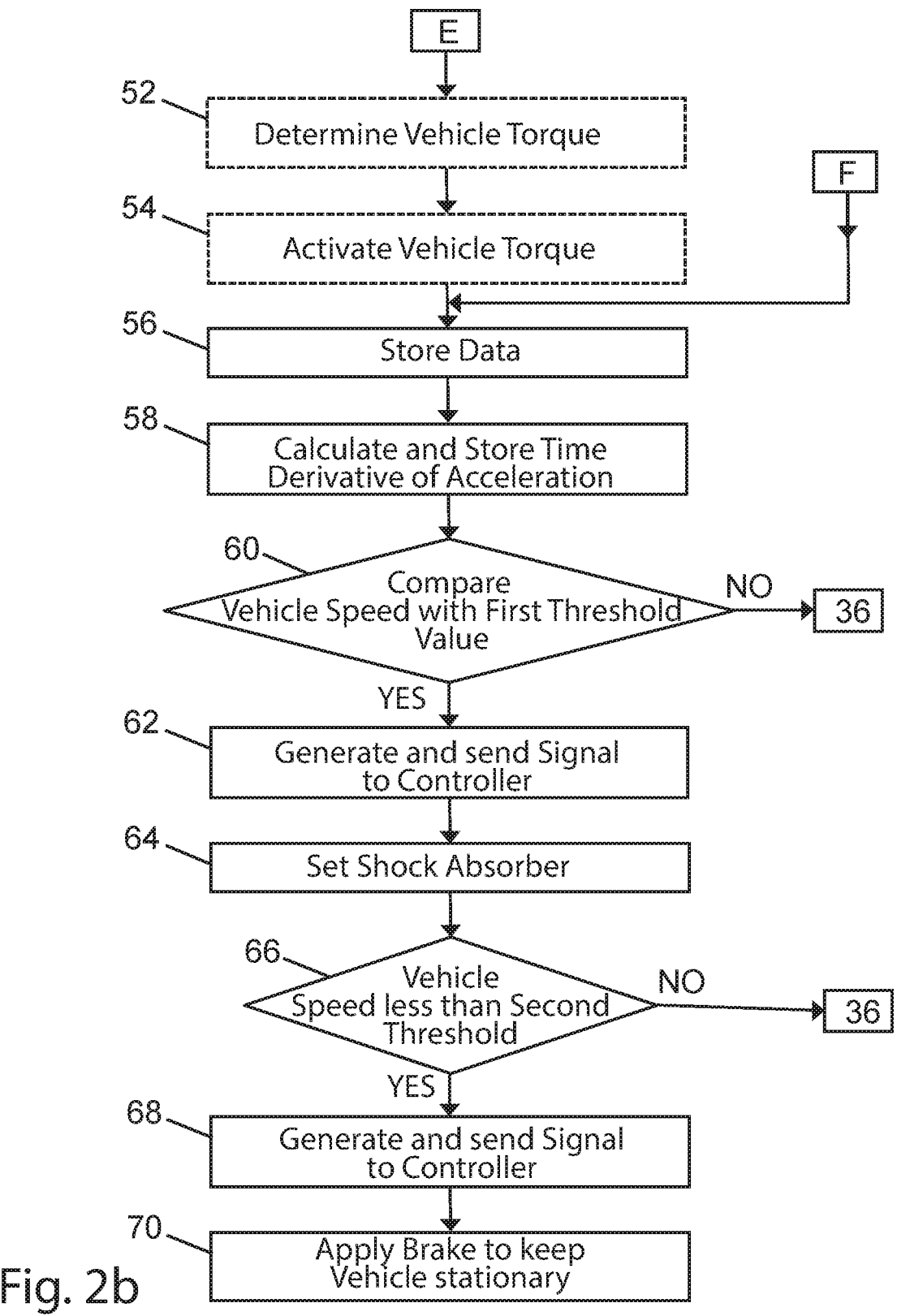

FIGS. 2a and 2b illustrate a flowchart of the method for braking the vehicle 24 with subsequent stoppage on a sloping section according to one embodiment. In preparation for operation of the braking assistance system 10, all apparatuses, devices and systems involved are in a ready-to-operate state and are arranged and connected to one another in the manner illustrated in FIG. 1.

The microcontroller 14 includes a software module wherein steps of the method to be executed are converted into a program code of the software module. The program code is implemented in the digital data memory unit 18 of the microcontroller 14 and can be executed by the processing unit 16 of the microcontroller 14.

The method starts with step 34 by switching on the ignition of the vehicle 24. In preparatory steps, the vehicle weight is ascertained during accelerated driving of the vehicle 24, for example when starting, from a determined instantaneous acceleration a and a drive power output at drive wheels of the vehicle 24, this being symbolized by block G.

In a first step 36 of the method, the control unit 12 determines or ascertains an instantaneous slope inclination of the roadway section based on data received from the inclination sensor 20. The control unit 12 further determines or ascertains an instantaneous acceleration a of the vehicle 24 based on data received from the acceleration sensor 22.

In a next step 38 an instantaneous vehicle velocity or speed v of the vehicle 24 is obtained from the velocity or speed measurement system 30 and an instantaneous operation status of the brake of the vehicle 24 is obtained from the brake pedal sensor or other apparatus 28. The instantaneous vehicle velocity or speed v and instantaneous operation status of the brake are read from the electronic vehicle controller 26 by the electronic control unit 12 via the CAN bus 23.

In step 40, the method compares the determined or ascertained instantaneous slope inclination of the roadway section with a first predetermined threshold value for a sloping section. The method returns to step 36 when the ascertained instantaneous slope inclination of the roadway section is lower than the first predetermined threshold value for a sloping section. When the ascertained instantaneous slope inclination of the roadway section is equal to or greater than the first predetermined threshold value for a slope section the method moves to, the next step 42.

In step 42 the determined or ascertained instantaneous operation status of the brake is compared with a predetermined value. The method returns to step 36 when the ascertained instantaneous operation status of the brake lies outside the predetermined interval, range, or value. If the determined or ascertained instantaneous operation status of the brake lies within the predetermined interval, range or value the method moves to step 44 wherein the electronic control unit 12 determines an instantaneous braking torque BM based on the slope inclination, velocity or speed v, acceleration a, and the vehicle weight. The instantaneous braking torque BM selected so the absolute acceleration a of the vehicle 24 during operation of the brake 35 until the stoppage is lower than a predetermined absolute maximum value and the time derivative of the acceleration a is lower than a predetermined absolute maximum value.

Figure 3:
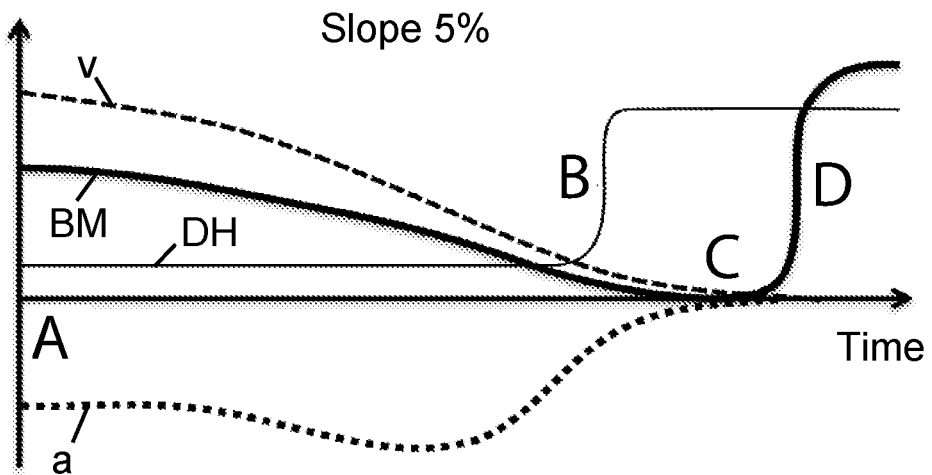
FIG. 3 is a timing diagram of different physical parameters occurring during application of the method for a sloping section with a small slope inclination.
Figure 4:
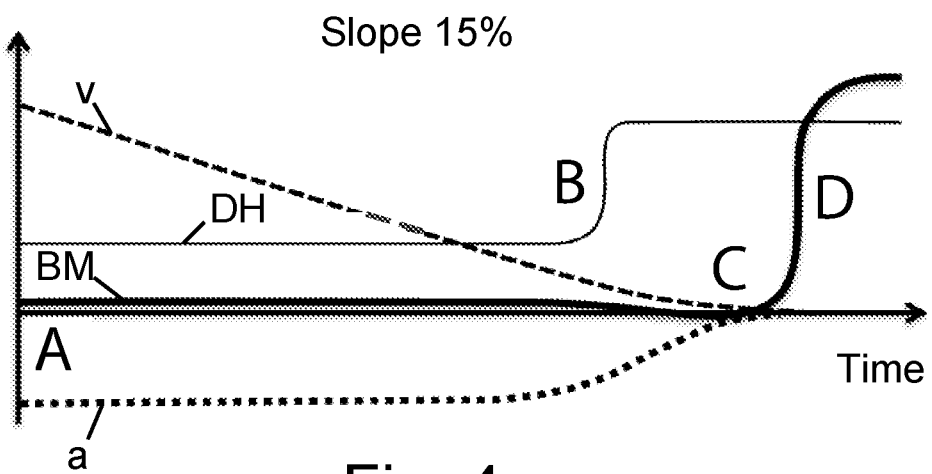
FIG. 4 is a timing diagram of the same physical parameters of FIG. 3 occurring during application of the method for a sloping section with a large slope inclination.

The selected instantaneous braking torque BM depends on the instantaneous slope inclination. FIG. 3 shows, for example, a timing diagram of the instantaneous velocity or speed v, the instantaneous braking torque BM, and the instantaneous acceleration a during an application of the method for a sloping section having a slope inclination of 5% or low slope. FIG. 4 shows, for example, a timing diagram of the instantaneous velocity or speed v, the instantaneous braking torque BM, and the instantaneous acceleration a during an application of the method for a sloping section having a slope inclination of 15% or high slope. The selected instantaneous braking torque BM in the case of the sloping section with a 15% upward inclination is much lower than in the case of the sloping section with a 5% upward inclination because of the greater deceleration owing to the downhill slope force. At time A, the conditions in respect of the instantaneous operation status of the brake and the instantaneous slope inclination of the roadway section are met.

FIG. 2a shows step 46 wherein the electronic control unit 12 transmits the value of the instantaneous braking torque BM to the electronic vehicle controller 26. Step 48 shows the controller 32 activating the transmitted instantaneous braking torque BM to control the brake 35. The method continues with step 56. Intermediate steps 50, 52, 54 are explained further below. In step 56, FIG. 2b, the electronic control unit 12 stores data relating to the transmitted instantaneous braking torque BM, the instantaneous slope inclination of the roadway section, the instantaneous acceleration of the vehicle a, and the instantaneous velocity or speed v of the vehicle in the digital memory unit 18.

In step 58, the electronic control unit 12 calculates the time derivative of the acceleration a by forming difference quotients. The calculated time derivative of the acceleration a is likewise stored in the digital memory unit 18 and the method continues with step 60.

In step 60, the instantaneous velocity or speed v of the vehicle 24 is compared with a first predetermined lower threshold value for the velocity or speed v. The method returns to step 36 when the instantaneous velocity or speed v lies above the first predetermined lower threshold value. However, when the instantaneous velocity or speed v is equal to or lower than the first predetermined lower threshold value, the electronic control unit 12 generates a corresponding signal in step 62 and sends the signal to the electronic vehicle controller 26. In step 64, a shock absorption hardness DH, increased in relation to a normal value, is set at time B, see FIGS. 3 and 4, for the shock absorbers 33 by the controller 32 as controlling the settable shock absorbers 33 of the vehicle 24.

In addition, in step 64, when the instantaneous velocity or speed v is equal to or lower than the first predetermined lower threshold value, the electronic control unit 12 selects the instantaneous braking torque BM in such a way that the acceleration a and also the time derivative of the acceleration a are a strictly monotonically function, that tends toward zero in a time interval immediately before the stoppage of the vehicle 24 at time C in FIGS. 3 and 4. The data stored in the digital memory unit 18 is used for this purpose.

In step 66, the instantaneous velocity or speed v is compared with a second predetermined lower threshold value of, for example, 2 km/h. the method continues to step 36 when the instantaneous velocity or speed v lies above the second predetermined lower threshold value. However, when the instantaneous velocity or speed v is equal to or lower than the second predetermined lower threshold value, the electronic control unit 12 generates, in step 68, a corresponding signal and sends the signal to the electronic vehicle controller 26. In step 70, the brake 35 is applied by the controller 32 to keep the vehicle 24 in the stationary position as shown by time D in FIGS. 3 and 4.

Depending on the slope inclination of the sloping section, for example on the upward inclination, the method provides corresponding time profiles for the instantaneous acceleration a of the vehicle 24. Braking of the vehicle 24 without jerking is achieved by the time derivative of the acceleration a limited at the top. The braking assistance system 10 controls the instantaneous braking torque BM such that, given the same upward slope inclination of the sloping section, the same time profile of the instantaneous acceleration a of the vehicle 24 is always achieved.

In an optional step 50 of the method, illustrated with dashed lines in FIGS. 2a and 2b, the instantaneous slope inclination of the roadway section can be compared with a second predetermined threshold value for an upward sloping section, for example 20%. The method continues with step 56 when the instantaneous slope inclination of the roadway section is lower than the second predetermined threshold value. However, when the instantaneous slope inclination of the roadway section is equal to or greater than the second predetermined threshold value the method moves to optional step 52 wherein a driving torque, determined by the electronic control unit 12 based on the instantaneous slope inclination, the instantaneous velocity or speed v, the instantaneous acceleration a, and the vehicle weight is sent by the electronic control unit 12 through a corresponding signal to the electronic vehicle controller 26. The determined driving torque is applied in step 54 through the electronic vehicle controller 26.

In one embodiment, the method for braking a vehicle with subsequent stoppage on a sloping section includes continuously ascertaining an instantaneous slope inclination of the roadway section, an instantaneous velocity or speed, an instantaneous acceleration, and an instantaneous operation status of a brake of the vehicle. Upon determining or ascertaining the instantaneous slope inclination of the roadway section reaches or exceeds a predetermined threshold value for a sloping section and the instantaneous operation status of the brake lies within a predetermined range or value applying an instantaneous braking torque, continuously determined at least based on the slope inclination, the driving speed and the acceleration. The instantaneous braking torque being independent of the instantaneous operation status of the brake, that is the braking torque BM operates to control the brake 35 independent of the brake operation status as long as the brake pedal operation status is within the predetermined interval, range or value set forth in step 42.

As used herein a "vehicle" should be understood to mean a passenger car, a truck or a bus.

In this context, the term "ascertaining" is intended to mean to find out or learn by investigation, reasoning, calculation or measurement, to determine, to detect, and also measurement sampling at predetermined times, in particular equidistant times.

In this context, the term "instantaneous" variable is understood as a variable ascertained in real time.

The disclosed embodiment achieves an increased degree of traveling comfort for a driver of the vehicle and any passenger in braking situations on sloping sections with subsequent stoppage. Rocking and backward movements of the vehicle may be considerably reduced or even eliminated.

When the instantaneous operation status of the brake lies below the predetermined range or value, for example by the driver removing his foot from the brake pedal to continue driving, the condition for activating the braking torque is not met, and the driver can continue to drive without obstruction.

When the instantaneous operation status of the brake lies above the predetermined range or value, for example to perform full braking in the event of an emergency, the condition for activating the braking torque is likewise not met, and the driver can perform full braking without obstruction.

The instantaneous operation status of the brake of the vehicle can preferably be ascertained by a sensor for determining a brake pedal position of the vehicle. The sensor for determining a brake pedal position can be an integral constituent part of the vehicle, for example a brake pedal position sensor.

In an embodiment of the method, the step of activating the braking torque includes the absolute acceleration of the vehicle, during the operation of the brake until the stoppage, being lower than a predetermined absolute maximum value and the absolute time derivative of the acceleration, also called "jerk," being lower than a predetermined absolute maximum value wherein the acceleration and the time derivative of the acceleration tend toward zero in a time interval immediately before the stoppage. In this way, a "soft" braking process is achieved, providing the driver of the vehicle and any passengers with a high degree of comfort.

Because the method applies to braking processes, the accelerations occurring are negative, they are decelerations. Therefore, the term "deceleration" is also used in the text for explanatory purposes when a negative acceleration is meant. The method is not directed at a starting or start assist, but to a braking assistant or brake assist wherein the vehicle brakes to a stop on a sloping section.

When the determination is performed by metrological or measurement sampling by discrete measurements, the braking torque can be derived with respect to time by forming a difference quotient.

The continuously determined instantaneous braking torque can be selected depending on the determined instantaneous slope inclination of the sloping section. For example, with a steep sloping section, the instantaneous braking torque can be selected to be smaller than the instantaneous braking torque with a less steep sloping section.

A time profile of the instantaneous acceleration of the vehicle and a time profile of the time derivative of the instantaneous acceleration of the vehicle preferably tend strictly monotonically toward zero. Here, the term "strictly monotonically" is understood in the mathematical sense, for example a monotonic function.

In a preferred embodiment, the method includes an additional step of applying the brake upon determination that the vehicle has an instantaneous velocity or speed close to zero. In this context, the term "close to zero" should be understood to mean an instantaneous velocity or speed of less than 5 km/h, preferably less than 3 km/h and, particularly preferably, less than 1 km/h. As a result, the vehicle can be brought to a stop from a driving speed close to zero in a safe manner and without the risk of rolling back. Further, the term "negligible" relates to an instantaneous velocity or speed of less than 1 km/h.

In a further embodiment, the method includes additional steps of comparing the instantaneous velocity or speed with a predetermined lower threshold value for the velocity or speed, and when it is detected that the instantaneous velocity or speed reaches or falls below the predetermined lower threshold value for the velocity or speed, setting at least the rear shock absorbers of the vehicle to a shock absorption hardness increased in relation to a normal value. In this way, rocking and backward movements of the vehicle during braking shortly before the subsequent stoppage can be advantageously reduced.

In another embodiment the method includes determining a vehicle weight, and adjusting the braking torque to be activated taking into account the determined vehicle weight. In this way, the method extends to a vehicle fully loaded with a tensile load, such as a trailer for example, or by cargo. Although the trailer is negatively accelerated or braked on a sloping section by the slope inclination force in the same way as the vehicle itself, a greater braking torque is required to brake a vehicle and trailer in the same way as on a level surface. Adjusting the braking torque to be activated, taking into account the total vehicle weight, with trailer or cargo, compensates for the additional weight. Particularly taking into consideration that different rolling resistances occur with relatively heavy or relatively light vehicles, wherein a relatively heavy vehicle driving uphill would be braked more quickly than a relatively light vehicle driving uphill in this respect.

However, the vehicle weight can also be ascertained, for example using weight sensors, during accelerated driving of the vehicle from a detected instantaneous acceleration and a detected drive power output at drive wheels of the vehicle.

In an embodiment the method includes comparing the instantaneous slope inclination of the roadway section with a second predetermined threshold value for a sloping section, and when it is detected that the instantaneous slope inclination of the roadway section reaches or exceeds the second predetermined threshold value for a sloping section, activating a driving torque determined based on the instantaneous slope inclination, the instantaneous driving speed, the instantaneous acceleration, and the vehicle weight.

The terms "first", "second" etc. used herein serve only for the purpose of forming a distinction. Use of said terms is not intended to imply any order or priority of the objects mentioned in connection with these terms.

With a very large slope inclination of the sloping section, a very rapid braking providing only a limited degree of driving comfort would be performed. Here, braking of the vehicle with subsequent stoppage can be carried out with improved comfort by the combination of a driving torque and a braking torque. The aspect of different rolling resistances should also be noted here, so that adjustment is carried out in accordance with the actual weight, wherein excessively sharp, uncomfortable braking with very steep slope inclinations and heavy vehicles can be avoided by the counteraction of the driving torque.

In one embodiment, the vehicle includes a braking assistance system for braking the vehicle with subsequent stoppage on a sloping section. The braking assistance system including an electronic control unit, an inclination sensor connected to the control unit, and an acceleration sensor connected to the control unit. Inclination sensors for the automotive sector are commercially available and therefore need not be described in detail.

The electronic control unit receives data from a velocity or speed measurement system to determine or ascertain an instantaneous velocity or speed of the vehicle. Further the electronic control unit receives data from an apparatus, such as a sensor, including a brake pedal position sensor, to determine or ascertain an instantaneous operation status of the brake of the vehicle. The electronic control unit continuously determining or ascertaining the instantaneous velocity or speed, the instantaneous operation status of the brake or the instantaneous brake pedal position, the instantaneous slope inclination of the roadway section, and the instantaneous acceleration.

The electronic control unit activates a brake system creating an instantaneous braking torque based on the instantaneous slope inclination, instantaneous driving speed, and the instantaneous acceleration. The instantaneous braking torque being independent of the instantaneous operation status of the brake when the instantaneous operation status of the brake lies within a predetermined range or value and the instantaneous slope inclination of the roadway section reaches or exceeds a predetermined threshold value for a sloping section.

In this context, the term "is intended to" should be understood to mean programmed, designed or arranged specifically therefor.

The velocity or speed measurement system is preferably a velocity or speed measurement system associated with the vehicle. However, it is also feasible to use a different speed measurement system which does not form part of the vehicle.

The electronic control unit may include a microcontroller having a processing unit and a digital data memory unit to which the processing unit has data access. Microcontrollers are commercially available in many forms. This allows the method according to the invention to be automatically and reliably executed by the braking assistance system. The predetermined threshold values, maximum values and intervals disclosed in this application can advantageously be stored in the digital data memory unit, because of which rapid access can be achieved.

The data may be received, for example, by a bus interface, for example for a Controller Area Network or CAN bus which can be of wired or wire-free design.

In an embodiment of the braking assistance system, the electronic control unit activates an instantaneous braking torque in such a way that, during operating the brake until the stoppage of the vehicle, the absolute acceleration of the vehicle is lower than a predetermined absolute maximum value, the time derivative of the acceleration is lower than a predetermined absolute maximum value, and the acceleration and the time derivative of the acceleration tend toward zero in a time interval immediately before the stoppage. The particularly "soft" braking process as described can be achieved, allowing a high driving comfort for the driver of the vehicle and any possible passengers.

A time profile of the instantaneous acceleration of the vehicle and a time profile of the time derivative of the instantaneous acceleration of the vehicle can tend strictly monotonically toward zero.

In an embodiment of the braking assistance system, the electronic control unit activates application of the brake at an instantaneous velocity or speed close to zero. In this way, a simple and reliable solution to preventing the vehicle from rolling back can be provided for safely bringing the vehicle to a stop from a velocity or speed close to zero.

A solution, particularly simple in structural terms, for reducing rocking and backward movements of the vehicle during braking shortly before the subsequent stoppage can be achieved when the electronic control unit is connected to a control unit for setting a shock absorption hardness of settable shock absorbers of the vehicle. The control unit initiating a shock absorption hardness setting increased in relation to a normal value upon determining when an instantaneous driving speed that reaches a predetermined lower threshold value during braking. The shock absorbers may be both front and rear shock absorbers. The control unit for setting a shock absorption hardness can preferably be an integral constituent part of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for braking a vehicle on a slope comprising:
ascertaining a slope inclination, a vehicle speed, and a vehicle acceleration;
ascertaining an operation status of a vehicle brake based on a position of a brake pedal;
determining a braking torque based on the slope inclination, the vehicle speed, and the vehicle acceleration when the slope inclination reaches a predetermined threshold value and the operation status of the vehicle brake lies within a predetermined interval;
the braking torque independent of the vehicle brake operation status;
using the braking torque to control the vehicle brake independent of the brake operation status;
comparing the vehicle speed with a predetermined lower threshold value for the vehicle speed; and
upon determining the vehicle speed reaches the predetermined lower threshold value for the vehicle speed setting a shock absorber hardness in a shock absorber to a shock absorption hardness that is increased in relation to a normal value.

2. The method of claim 1 wherein the step of activating the braking torque includes determining the acceleration of the vehicle during vehicle brake operation until the acceleration is lower than a predetermined absolute maximum value; and
a time derivative of the acceleration being lower than a predetermined maximum value with the acceleration and the time derivative of the acceleration tending toward zero in a time interval immediately before vehicle stoppage.

3. The method of claim 1 including applying the vehicle brake upon determining a negligible vehicle speed.

4. The method of claim 1 including determining a vehicle weight; and
adjusting the braking torque based on the determined vehicle weight.

5. The method of claim 4 including;
comparing the slope inclination with a second predetermined threshold value; and
activating a driving torque determined based on the slope inclination, the vehicle speed, the acceleration and the vehicle weight when the slope inclination reaches the second predetermined threshold value.

6. A braking assistance system comprising:
an electronic control unit operative to receive data from a speed measurement system for ascertaining a vehicle speed and a sensor for ascertaining a vehicle brake operation status;
an inclination sensor connected the control unit;
an acceleration sensor connected to the control unit;
wherein the electronic control unit continuously ascertains the vehicle speed, the vehicle brake operation status, the inclination, and the acceleration and based on slope, vehicle speed, and acceleration activates an instantaneous braking torque independent of the vehicle brake operation status when the vehicle brake operation status lies within a predetermined interval and slope reaches a predetermined threshold value; and
wherein the electronic control unit operates to set a shock absorption hardness of a vehicle settable shock absorber at a shock absorption hardness setting increased above a predetermined threshold setting when the vehicle speed reaches a predetermined lower threshold value during braking.

7. The braking assistance system of claim 6 wherein the electronic control unit activates the braking torque such that the acceleration of the vehicle is lower than a predetermined maximum value, the time derivative of the acceleration is lower than a predetermined maximum value, and the acceleration and the time derivative of the acceleration tend toward zero in a time interval immediately before vehicle stoppage.

8. The braking assistance system of claim 6 wherein the electronic control unit activates application of a vehicle brake at a vehicle speed close to zero.

9. A method for braking a vehicle on a slope comprising:
determining a vehicle weight;
ascertaining a slope inclination, a vehicle speed, a vehicle acceleration, and a vehicle brake operation status;
activating a braking torque based on the slope inclination, the driving speed, the acceleration, and the vehicle weight, the braking torque being independent of the vehicle brake operation status, when the slope inclination reaches a predetermined threshold value and the vehicle brake operation status lies within a predetermined interval; and
determining when the vehicle speed reaches a predetermined vehicle speed lower threshold value and setting a shock absorber hardness in a shock absorber to a shock absorption hardness increased in relation to a preexisting value based on the vehicle speed.

10. The method of claim 9 including;
comparing the slope inclination with a second predetermined threshold value; and
activating a driving torque determined based on the slope inclination, the vehicle speed, the acceleration and the vehicle weight when the slope inclination reaches the second predetermined threshold value.

11. The method of claim 9 wherein the step of activating the braking torque includes determining the acceleration of the vehicle during vehicle brake operation until the acceleration is lower than a predetermined acceleration maximum value; and
 a time derivative of the acceleration being lower than a predetermined time derivative of the acceleration maximum value with the acceleration and the time derivative of the acceleration tending toward zero in a time interval immediately before vehicle stoppage.

12. The method of claim 9 including applying the vehicle brake upon determining a negligible vehicle speed.

* * * * *